(12) United States Patent
Kaneko et al.

(10) Patent No.: US 11,151,729 B2
(45) Date of Patent: Oct. 19, 2021

(54) MOBILE ENTITY POSITION ESTIMATION DEVICE AND POSITION ESTIMATION METHOD

(71) Applicant: HITACHI AUTOMOTIVE SYSTEMS, LTD., Hitachinaka (JP)

(72) Inventors: Alex Masuo Kaneko, Tokyo (JP); Kenjiro Yamamoto, Tokyo (JP); Shinya Ootsuji, Ibaraki (JP); Shigenori Hayase, Ibaraki (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 12 days.

(21) Appl. No.: 16/753,100

(22) PCT Filed: Sep. 20, 2018

(86) PCT No.: PCT/JP2018/034736
§ 371 (c)(1),
(2) Date: Apr. 2, 2020

(87) PCT Pub. No.: WO2019/073772
PCT Pub. Date: Apr. 18, 2019

(65) Prior Publication Data
US 2020/0279380 A1    Sep. 3, 2020

(30) Foreign Application Priority Data
Oct. 11, 2017  (JP) .............................. JP2017-197327

(51) Int. Cl.
*G06T 7/254* (2017.01)
*G06T 7/292* (2017.01)
(Continued)

(52) U.S. Cl.
CPC .......... *G06T 7/254* (2017.01); *G05D 1/0253* (2013.01); *G06T 7/292* (2017.01); *G06T 7/73* (2017.01)

(58) Field of Classification Search
CPC .......... G06T 7/254; G06T 7/292; G06T 7/73; G06T 2207/30264; G06T 7/80; G06T 7/246; G05D 1/0253; G05D 1/02
See application file for complete search history.

(56) References Cited

U.S. PATENT DOCUMENTS

| 10,260,889 B2* | 4/2019 | Yamaguchi | G05D 1/02 |
| 2014/0152780 A1* | 6/2014 | Kanetake | H04N 13/282 |
| | | | 348/50 |

(Continued)

FOREIGN PATENT DOCUMENTS

| JP | 2006-323437 A | 11/2006 |
| JP | 2009-145230 A | 7/2009 |

(Continued)

*Primary Examiner* — John B Strege
*Assistant Examiner* — Daniel C Chang
(74) *Attorney, Agent, or Firm* — Volpe Koenig

(57) ABSTRACT

Improvement in the accuracy of estimating the position of a mobile entity even while traveling or if there is an error in the calibration performed utilizing: a mobile entity; an imaging device provided in the mobile entity; and an information processing device for determining a first movement amount by which a detection point that is the same object has moved on the basis of a first image and a second image acquired by the imaging device and a second movement amount by which the mobile entity has moved while the first image and the second image were acquired, determining the accuracy of recognizing the detection point acquired by the imaging device on the basis of the first movement amount and the second movement amount, and estimating the position of the mobile entity on the basis of the accuracy of (Continued)

recognition and position information that pertains to the detection point.

6 Claims, 12 Drawing Sheets

(51) Int. Cl.
    *G06T 7/73*         (2017.01)
    *G05D 1/02*         (2020.01)

(56)           References Cited

U.S. PATENT DOCUMENTS

2018/0225524 A1\*   8/2018   Fujita ...................... G06T 7/246
2018/0292201 A1\*  10/2018   Sakano .................. H04N 5/232
2019/0066312 A1    2/2019   Kaneko et al.

FOREIGN PATENT DOCUMENTS

| JP | 2014-165810 A | 9/2014 |
| JP | 2017-78923 A | 4/2017 |
| WO | 2017-145541 A1 | 8/2007 |

\* cited by examiner

MOBILE ENTITY POSITION ESTIMATION DEVICE AND POSITION ESTIMATION METHOD

TECHNICAL FIELD

The present invention relates to a position estimation device and a position estimation method of a mobile entity such as a robot and an automobile.

BACKGROUND ART

Autonomous travel technology and drive support technology for a mobile entity such as a robot and an automobile to collect information about the surroundings, to estimate the current position and the running state of the mobile entity, and to control the running of the mobile entity have been developed.

Various types of sensors are used as means for collecting information on the surroundings and position of a mobile entity. Sensors for measuring surrounding information include a laser sensor and a millimeter-wave radar, in addition to an imaging device such as a camera. A global positioning system (GPS) or an inertial measurement unit (IMU) is used as a sensor for measuring the position of the mobile entity.

In the autonomous travel control, the control device mounted on the mobile entity integrates the velocity or angular velocity of the mobile entity calculated, for example, by the IMU or uses GPS positioning to estimate the position of the mobile entity itself (self position). In addition, if there is no map information or landmarks and GPS cannot be used either, the simultaneous localization and mapping (SLAM) method for creating a map of the environment during travel while estimating the relative position with the objects existing around the mobile entity is used. However, the error of the relative position estimated by the SLAM method is accumulated in a time series, as a result, the position correction is essential. In this position correction, for example, collecting surrounding information using a laser sensor, a camera, or the like, detecting landmarks such as road paint or signs serving as a reference for position estimation, and with the control device, comparing the position of the detected landmark with the map information corrects the current position of the mobile entity. Therefore, when the detected landmark has a position error, the position of the mobile entity cannot be corrected accurately in some cases.

In particular, when recognizing landmarks with a monocular camera, in order to geometrically calculate the distance to the recognized landmark, it is necessary to accurately transform the position of the landmark on the image of the camera into the position of the actual landmark. Here, in order to estimate the position of the landmark with high accuracy, it is necessary to execute internal parameter calibration and external parameter calibration of the camera. The internal parameter calibration corrects the lens distortion of the camera and calculates the focal length. On the other hand, the external parameter calibration determines the current installation height and angle of the camera.

For example, a camera mounted on a vehicle is attached to the vehicle at a position and an angle in accordance with predetermined design values of the camera, and at this time, an error may occur, and the recognition accuracy of the surroundings by the camera is reduced. In order to correct this error, generally, a calibration index printed on paper or a board is precisely set at a determined position and photographed, and in order that the photographed image matches the image photographed from a predetermined position, parameters of the camera are corrected. It is common to calibrate vehicles before shipping them at factories and the like, but since the attitude of the vehicle changes due to differences in the number of passengers, differences in sitting places, differences in how to load luggage, and the like, it is necessary to perform calibration even after shipment from the factory in some cases.

Here, for example, PTL 1 discloses an invention that relates to a calibration device for performing calibration of a camera mounted on a vehicle, and includes an image acquisition unit for acquiring an image outside the vehicle and a calibration unit for calibrating at least one camera parameter of a roll angle and a pitch angle of the camera using a corresponding feature point between the image before the attitude change and the image after the attitude change of the vehicle.

CITATION LIST

Patent Literature

PTL 1: JP 2017-78923 A

SUMMARY OF INVENTION

Technical Problem

In PTL 1, calibration of the monocular camera is performed using images before and after the attitude change, but since the effects of vibration during travel and the effects of errors during performing calibration are not considered and are not reflected in the camera's internal parameters or the camera's external parameters, the problem remains that the recognition accuracy of the position of the landmark recognized by the camera decreases. When the recognition accuracy of the position of the landmark decreases, the estimation accuracy of the position of the mobile entity itself also decreases.

Thus, an object of the present invention is to improve the accuracy of estimating the position of a mobile entity even when travel is in progress or there is an error in the calibration performed.

Solution to Problem

In order to solve the above problem, the present invention includes: a mobile entity; an imaging device provided in the mobile entity; and an information processing device for determining a first movement amount by which a detection point that is the same object has moved on the basis of a first image and a second image acquired by the imaging device and a second movement amount by which the mobile entity has moved during the acquisition of the first image and the second image, determining the accuracy of recognizing the detection point acquired by the imaging device on the basis of the first movement amount and the second movement amount, and estimating the position of the mobile entity on the basis of the accuracy of recognition and position information that pertains to the detection point.

Advantageous Effects of Invention

According to the present invention, the accuracy of estimating the position of a mobile entity can be improved even when travel is in progress or there is an error in the calibration performed.

DESCRIPTION OF EMBODIMENTS

Hereinafter, embodiments of the present invention will be described with reference to the drawings. It should be noted that the following is merely an example, and is not intended to limit the content of the invention to the following specific aspects. The invention itself can be implemented in various modes as long as it conforms to the contents described in the claims.

First Embodiment

Figure 1:
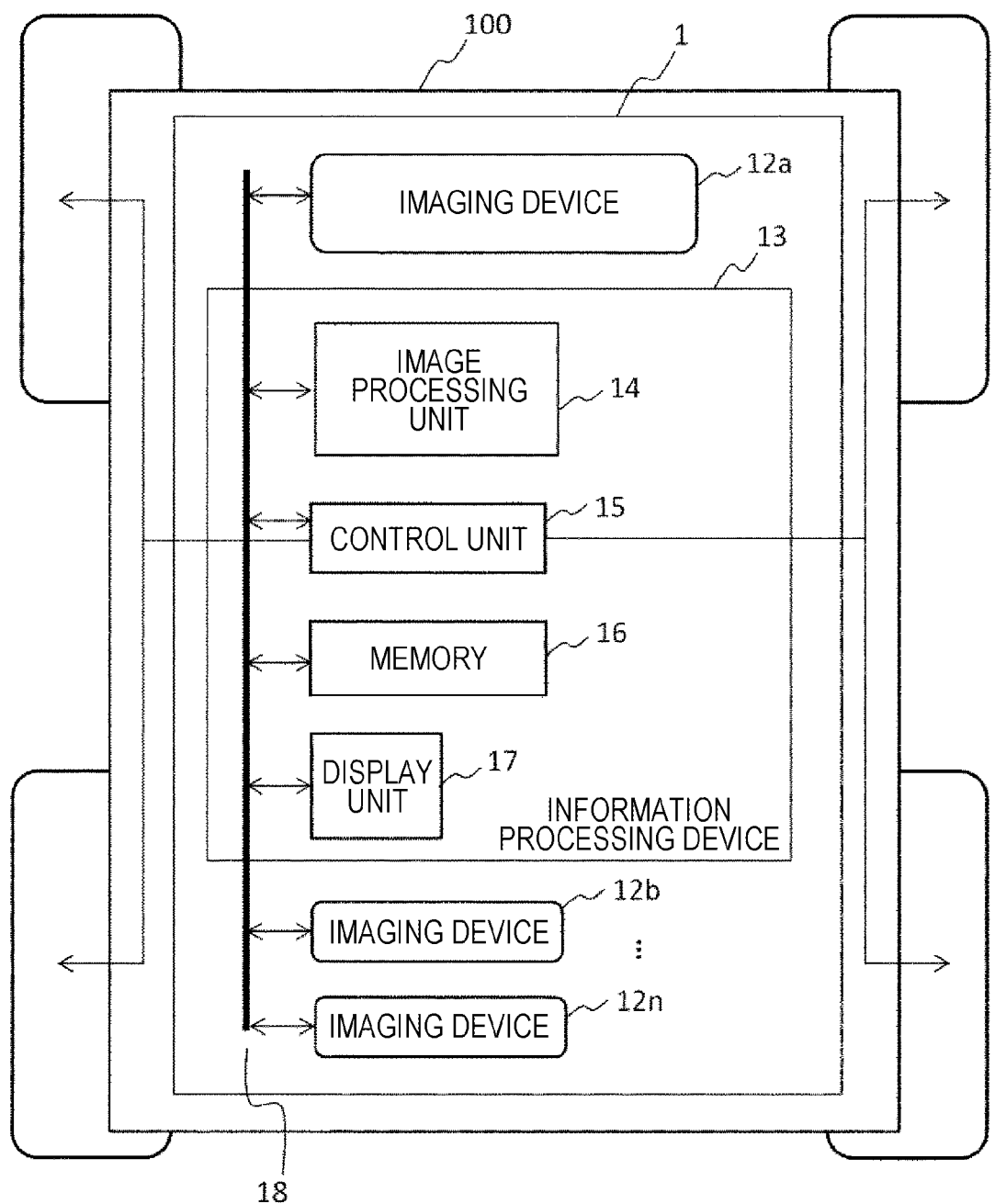
FIG. 1 is a configuration diagram of a position estimation device of a mobile entity according to an embodiment.

FIG. 1 is a configuration diagram of a position estimation device 1 of a mobile entity according to an embodiment. The position estimation device 1 is mounted on a mobile entity 100 such as an automobile or a robot. The position estimation device 1 includes one or more imaging devices 12a, 12b, ..., 12n, and an information processing device 13. The imaging devices 12a, 12b, ..., 12n are still cameras or video cameras, for example. In addition, the imaging devices 12a, 12b, ..., 12n may be monocular cameras or compound eye cameras.

The information processing device 13 processes the images captured by the imaging devices 12a, 12b, ..., 12n to calculate the position or the movement amount of the mobile entity 100. The information processing device 13 may perform display in accordance with the calculated position or movement amount, or may output a signal related to control of the mobile entity 100.

The information processing device 13 is, for example, a general computer, and includes an image processing unit 14 for processing an image captured by the imaging devices 12a, 12b, ..., 12n, a control unit 15 (CPU) for performing control based on the result of the image processing unit, a memory 16, a display unit 17 such as a display, and a bus 18 for interconnecting these components. The image processing unit 14 and the control unit 15 execute a predetermined computer program, whereby the information processing device 13 performs the following processing.

The imaging device 12a is installed in the front of the mobile entity 100, for example. The lens of the imaging device 12a is directed forward of the mobile entity 100. The imaging device 12a captures a distant view ahead of the moving entity 100, for example. The other imaging devices 12b, ..., 12n are installed at positions different from that of the imaging device 12a, and capture imaging directions or regions different from that of the imaging device 12a. The imaging device 12b may be installed in the rear of the mobile entity 100 to be directed downward, for example. The imaging device 12b may capture a near view behind the moving entity 100.

When the imaging device 12a is a monocular camera, if the road surface is flat, the positional relationship (x, y) between the pixel position on the image and the actual ground position is constant, so that the distance from the imaging device 12a to the feature point can be geometrically calculated. When the imaging device 12a is a stereo camera, the distance to a feature point on the image can be measured more accurately. In the following description, an example in which a camera having a monocular standard lens is adopted will be described, but another camera (such as a camera having a wide-angle lens or a stereo camera) may be used. In addition, the objects to be captured by the imaging devices 12a, 12b, ..., 12n at a certain time may be different from each other. For example, the imaging device 12a may capture a distant view ahead of the mobile entity 100. In this case, a feature point such as a three-dimensional object or a landmark for position estimation may be extracted from the image obtained by capturing the distant view. The imaging device 12b may capture a near view such as a road surface around the mobile entity 100. In this case, a white line around the mobile entity 100, road surface paint, or the like may be detected from the image obtained by capturing the near view.

In addition, the imaging devices 12a, 12b, ..., 12n may be installed on the mobile entity 100 under the conditions of not being simultaneously affected by environmental disturbances such as rain and sunlight. For example, the imaging device 12a may be installed to be directed forward in the front of the mobile entity 100, while the imaging device 12b may be installed to be directed backward or downward in the rear of the mobile entity 100. Thus, for example, even when raindrops adhere to the lens of the imaging device 12a during rainfall, the raindrops do not easily adhere to the lens of the imaging device 12b directed in a direction opposite to the traveling direction or downward. Therefore, even if the image captured by the imaging device 12a is unclear due to the effect of raindrops, the image captured by the imaging device 12b is less likely to be affected by raindrops. Alternatively, even if the image of the imaging device 12a is unclear due to the effect of sunlight, the image captured by the imaging device 12b may be clear.

In addition, the imaging devices 12a, 12b, ..., 12n may capture images under different capturing conditions (aperture value, white balance, and the like). For example, mounting an imaging device whose parameters are adjusted for a bright place and an imaging device whose parameters are adjusted for a dark place to make imaging possible regardless of the brightness of the environment may be used.

The imaging devices 12a, 12b, ..., 12n may capture images when receiving a shooting start command from the control unit 15 or at a fixed time interval. The data on and the imaging time of the captured image are stored in the memory 16. It should be noted that the memory 16 includes a main storage device (main memory) of the information processing device 13 and an auxiliary storage device such as a storage.

The image processing unit 14 performs various pieces of image processing based on the image data and the imaging time stored in the memory 16. In this image processing, an intermediate image is created and stored in the memory 16, for example. The intermediate image may be used for determination and processing by the control unit 15 and the like besides the processing by the image processing unit 14.

The bus 18 can include an Inter Equipment Bus (ZEBUS), a Local Interconnect Network (LIN), a Controller Area Network (CAN), or the like.

The image processing unit 14 identifies a plurality of position candidates of the mobile entity based on the image captured by the imaging device 12, and estimates the position of the mobile entity 100 based on the plurality of position candidates and the moving speed of the mobile entity 100.

In addition, the image processing unit 14 may process an image captured by the imaging device 12 while the mobile entity 100 travels to estimate the position of the mobile entity 100, or may calculate the movement amount of the mobile entity 100 based on the video image captured by the imaging device 12 to estimate the current position by adding the movement amount to the start point, for example.

The image processing unit 14 may extract a feature point from each frame image of the video image. The image processing unit 14 further extracts the same feature point in the subsequent frame images. Then, the image processing unit 14 may calculate the movement amount of the mobile entity 100 based on tracking the feature points.

The control unit 15 may output a command related to the moving speed to the mobile entity 100 based on the result of the image processing by the image processing unit 14. For example, according to the number of pixels of a three-dimensional object in the image, the number of outliers among the feature points in the image, the type of image processing, or the like, the control unit 15 may output commands to increase, to decrease, or to maintain the moving speed of the mobile entity 100.

Figure 2:
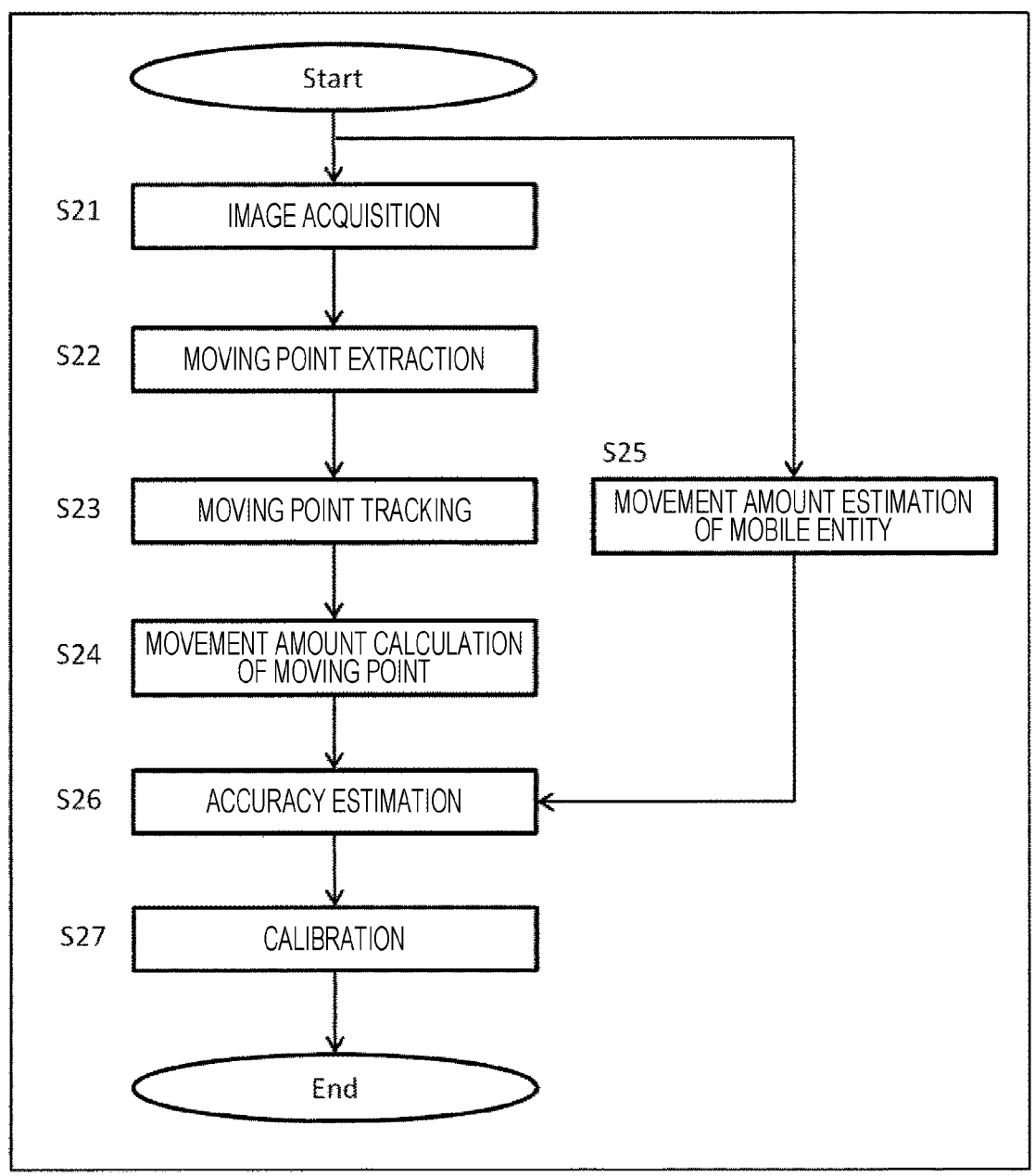
FIG. 2 is a flowchart showing an image processing procedure.

FIG. 2 is a flowchart illustrating an image processing procedure performed by the image processing unit 14.

The image processing unit 14 acquires image data captured by the imaging devices 12*a*, 12*b*, . . . , 12*n* from the memory 16 (S21). The image data acquired in step S21 may be image data including only one image or a plurality of images of the images captured by the imaging devices 12*a*, 12*b*, . . . , 12*n*. In addition, in step S21, not only the latest image captured by each of the imaging devices 12*a*, 12*b*, . . . , 12*n*, but also an image captured in the past may be used.

Next, the image processing unit 14 extracts a moving point in each of the acquired frame images (S22). The moving point may be a feature point such as an edge in the image, a corner, or a maximum value or minimum value of the pixel intensity, for example. For the extraction of the feature point, a technique such as Canny, Sobel, FAST, Hessian, and Gaussian only has to be used. A specific algorithm is appropriately selected according to the characteristics of the image. In addition, the moving point may be a representative point of the recognized landmark (center, corner, or the like of the landmark). Conventional image recognition techniques such as deep learning and template matching only have to be used for landmark recognition and representative point extraction. Details of the moving point will be described below.

The image processing unit 14 tracks the moving points extracted in each frame image according to the time series of the frame images (S23). For tracking, techniques have only to be used such as Lucas-Kanade method, Shi-Tomasi method, and Direct Matching method. In addition, the tracking in step S23 is not limited to the moving points of the frames acquired immediately before or immediately after, and may be the moving points of the frames acquired at intervals of several frames. The specific algorithm is appropriately selected according to the moving point of the image.

Next, a calculation for converting the respective moving points tracked in step S23 into the movement amount in the real world is performed (S24). The difference between the pixel position on the image obtained by the tracking in step S23 and the pixel position of the previous frame before that is calculated, and the difference is transformed into units of meters.

In step S25, the movement amount of the mobile entity on which the imaging device is mounted is estimated. In this step, the actual movement amount of the mobile entity 100 between the images captured this time and last time by the imaging devices 12*a*, 12*b*, . . . , 12*n* is estimated. For estimating the actual movement amount of the mobile entity 100, techniques such as GPS information, odometry, image odometry, and SLAM method have only to be adapted. In addition, a time series filter for estimating the movement amount this time based on the movement amount in the past may be used. In addition, also the movement amount of the mobile entity 100 may be estimated by combining the above-described sensor information and the filter. In the end, any sensor or combination may be used as long as a method can estimate the movement amount of the mobile entity 100 between the previous frame and the frame this time. The timing of performing step S25 may be immediately after step S24, or may be performed in parallel from step S21 to step S24. Step S25 may be performed at any time before the processing of step S26 starts.

In step S26, the accuracy of the moving point tracked in step S23 is estimated using the movement amount information about the moving point obtained in step S24 and the movement amount information about the mobile entity 100 obtained in step S25. Details of step S26 will be described below.

Based on the accuracy estimated in step S26, the calibration of the imaging devices 12*a*, 12*b*, . . . , 12*n* is performed if necessary (S27). Execution in step S27 is optional, and details will be described below.

Figure 3:
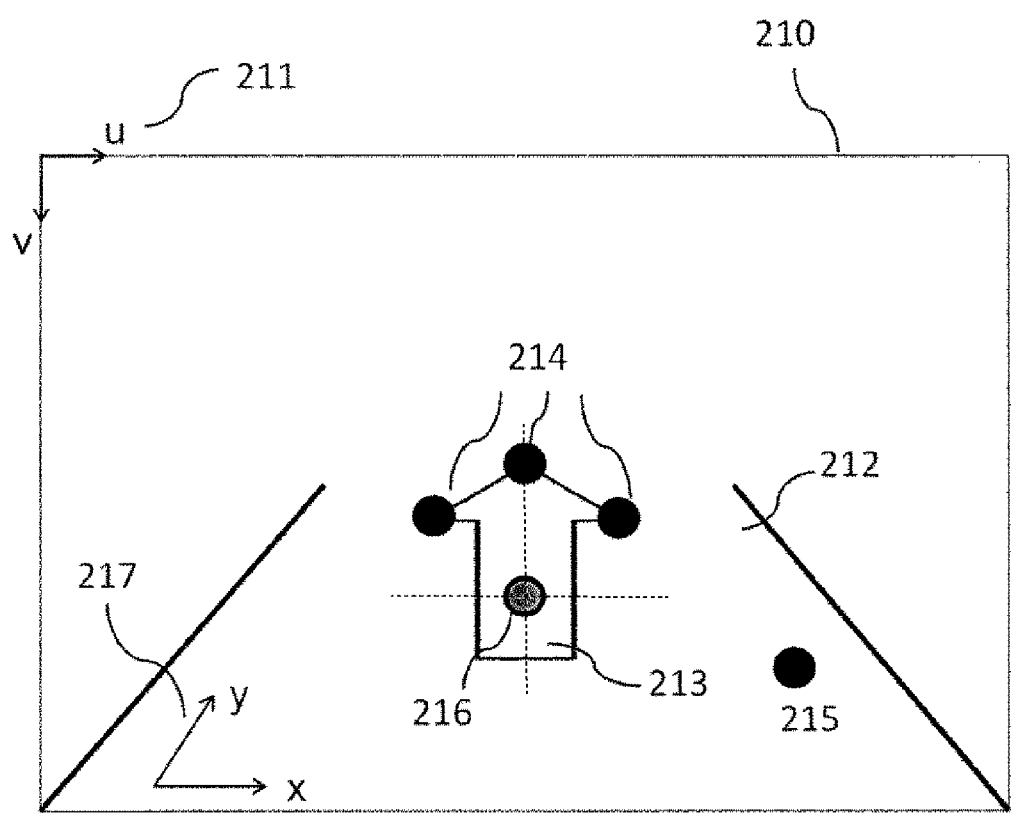
FIG. 3 is a diagram illustrating a moving point on an image.

FIG. 3 is a diagram illustrating a moving point on an image. The image 210 is an image acquired in step S21 by the imaging devices 12*a*, 12*b*, . . . , 12*n*. The coordinates 211 represented by (u, v) are a coordinate system in the image 210. The road 212 is a road appearing in the image 210 while the mobile entity 100 is in travel.

It is assumed that the mobile entity 100 travels on the road 212 and a landmark 213 on the road surface of the road 212 appears in the image 210 at a certain time. At this time, when the moving point is extracted in step S22, it is assumed that feature points 214 are extracted from the landmark 213. It should be noted that the feature points are not limited to the edges and corners in the image, and may be the maximum values or the minimum values of the pixel intensity. In addition, when landmarks are matched to the map, for simplicity, the recognized landmark may be represented by a representative point (center, corner, and the like of the landmark), and a representative point 216 is represented as a representative of the landmark 214. Here, the feature point 214, the feature point 215, and the representative point 216 extracted in step S22 on the image 210 are stationary points in the real world, and since the feature point 214, the feature point 215, and the representative point 216 move with respect to the imaging devices 12a, 12b, ..., 12n fixed to the mobile entity 100, the feature point 214, the feature point 215, and the representative point 216 are all defined as "moving points".

Figure 4:
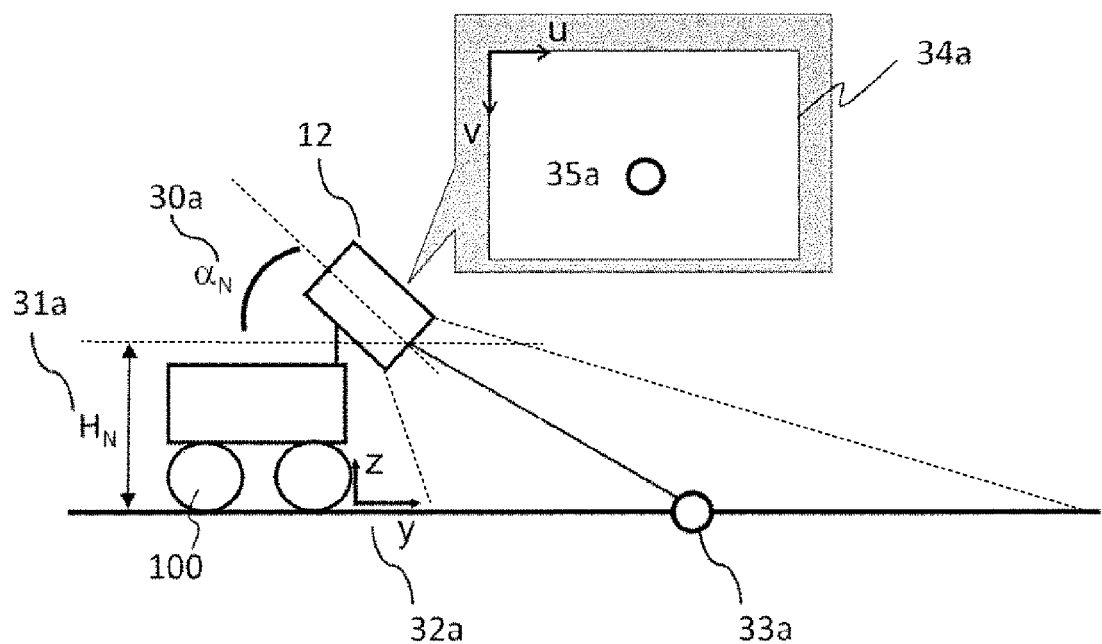
FIG. 4 is a diagram illustrating distance estimation of a moving point by an imaging device.
Figure 5:
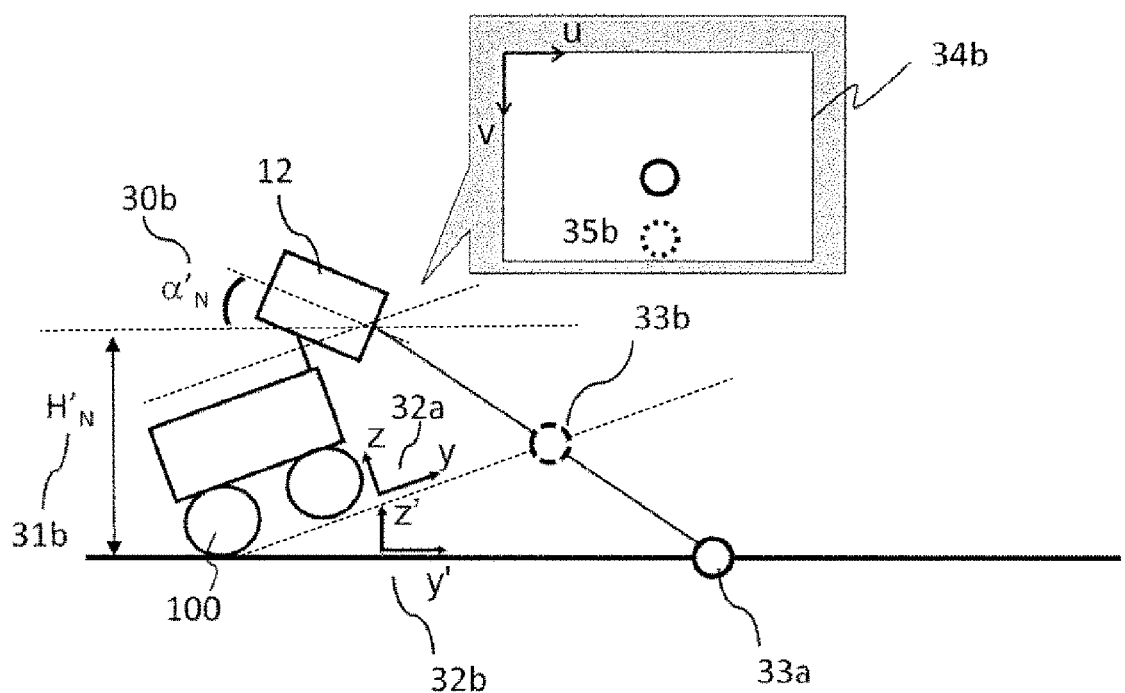
FIG. 5 is a diagram illustrating distance estimation of a moving point by an imaging device.
Figure 6:
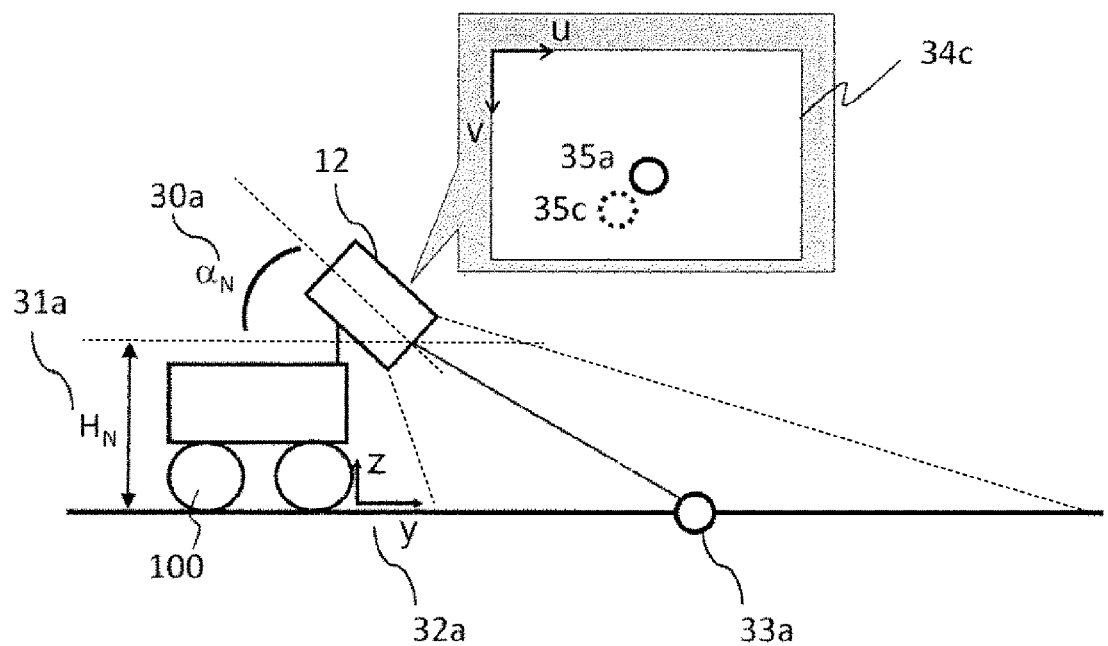
FIG. 6 is a diagram illustrating distance estimation of a moving point by an imaging device.

The distance estimation of the moving point detected by the imaging devices will be described with reference to FIGS. 4 to 6. FIGS. 4 to 6 are diagrams illustrating the distance estimation of the moving point by the imaging devices.

The installation angle αN 30a in FIG. 4 is the installation angle of the imaging devices 12a, 12b, ..., 12n with respect to the road surface on which the mobile entity 100 is in travel. The height $H_N$ 31a is the installation height of the imaging devices 12a, 12b, ..., 12n with respect to the road surface on which the mobile entity 100 is in travel. For simplicity, the imaging devices 12a, 12b, ..., 12n will be described with one imaging device 12 as a representative. The coordinates 32a are coordinates in units of meters fixed to the mobile entity 100, and the point 33a is one point on the road surface. At this time, the point 33a on the image 34a is extracted as a moving point in step S22, and is represented as a pixel 35a. In this case, it is assumed that the imaging device has been calibrated, and the relationship between the actual position (meter) of the point 33a and the moving point 35a (pixel) on the image is obtained by using the installation angle $α_N$ 30a and the installation height $H_N$ 31a. Therefore, when the installation angle αN 30a and the installation height $H_N$ 31a of the imaging device 12 are constant, the relationship between the coordinates 32a (meters) and the image (pixel) is constant, and transformation from meters into a pixel can be easily performed. In addition, if the installation angle $α_N$ 30a and the installation height $H_N$ 31a of the imaging device 12 are constant, even if the image 34a is transformed into a bird's-eye view image or the like, if the transformation parameters are known, the relationship between the coordinates 32a (meters) and the image (pixel) does not change.

On the other hand, FIG. 5 illustrates a case different from the case where the calibration of the imaging device is performed in the state in FIG. 4. It is assumed that the installation angle $α_N$ 30a of the imaging device 12 becomes the installation angle α'N 30b and the height $H_N$ 31a becomes the height $H_N$ 31b due to the difference in the vibration and the number of passengers. In this state, the point 33a is extracted as the moving point 35b on the image 34b, but since calibration has been performed based on coordinates 32a, the distance to the virtual point 33b with respect to the coordinates 32a is calculated. However, in this case, since the distance to the point 33a with respect to the coordinates 32b is accurate, an error occurs when the distance with respect to the coordinates 32a is calculated. For simplicity, the case where the pitch angle of the mobile entity 100 is transformed has been described with reference to FIG. 5, but even when the roll angle or the yaw angle of the mobile entity 100 changes, the above-described principle does not change.

FIG. 6 shows the same installation angle $α_N$ 30a, height $H_N$ 31a, coordinates 32a, and point 33a as in FIG. 4. The image 34c acquired by the imaging device 12 in step S21 represents an image whose distortion cannot be corrected even after calibration. In the image 34c whose distortion has not been corrected, the point 33a appears as a pixel 35c, and appears at a position different from that of the pixel 35a of the image 34a whose distortion has been corrected. Therefore, even if the moving point 33a is extracted from the image 34c whose distortion has not been corrected, when the pixel 35c is transformed into meters and the actual position is estimated, the error is large.

Figure 7:
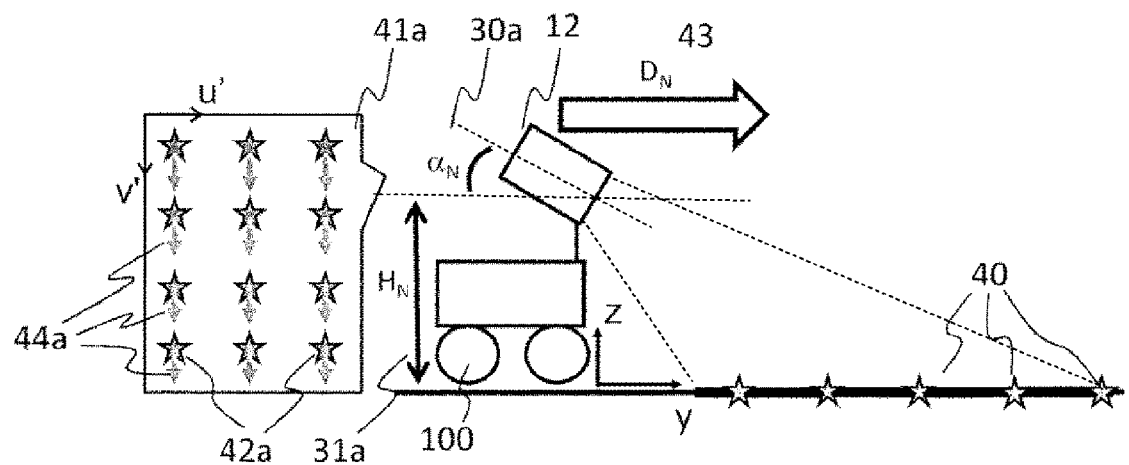
FIG. 7 is a diagram illustrating a principle related to position estimation.
Figure 8:
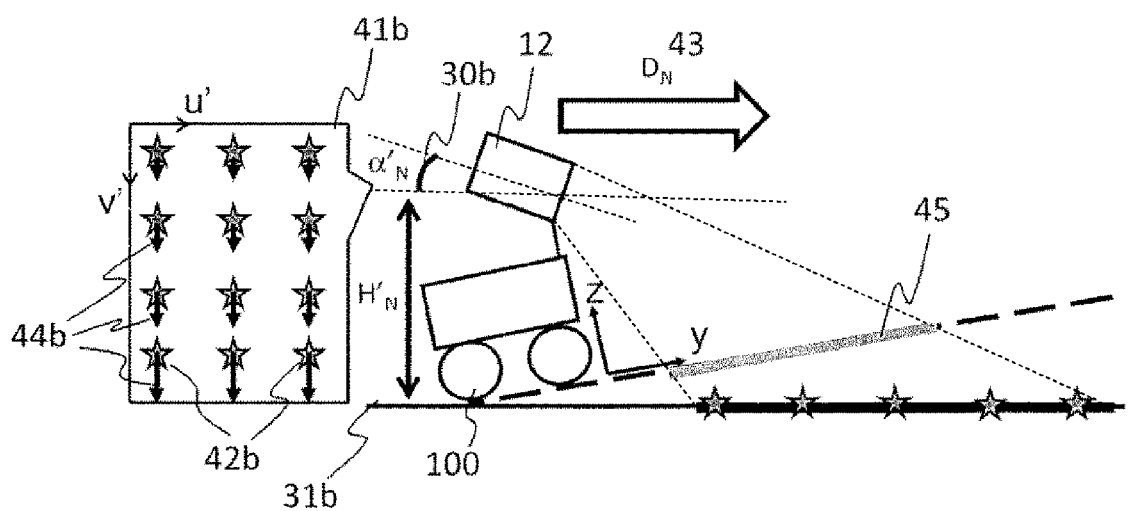
FIG. 8 is a diagram illustrating a principle related to position estimation.
Figure 9:
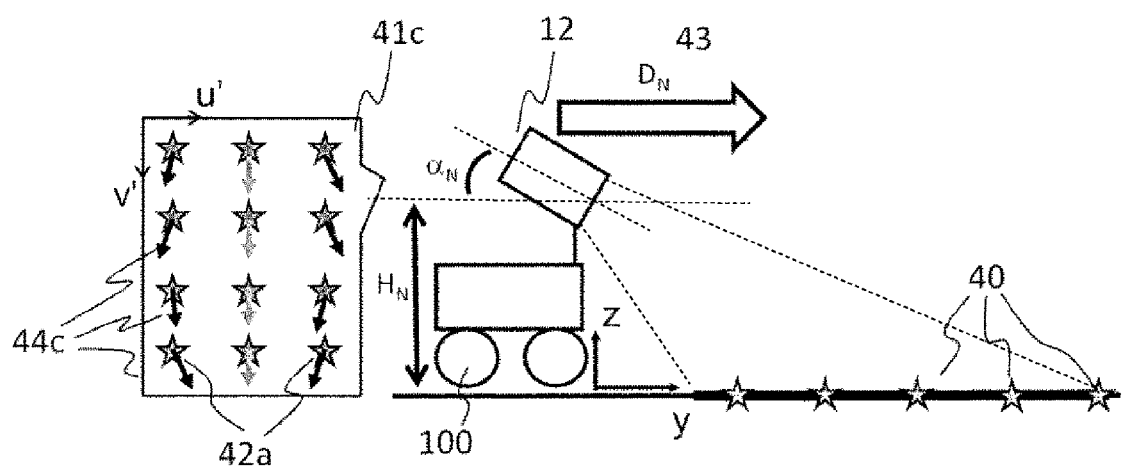
FIG. 9 is a diagram illustrating a principle related to position estimation.

Next, the principle of the present embodiment will be described with reference to FIGS. 7 to 9. FIGS. 7 to 9 are diagrams illustrating the principle related to position estimation.

FIG. 7 shows a state in which the mobile entity 100 travels at the same installation angle $α_N$ 30a and height $H_N$ 31a as when calibration is performed. It is assumed that the distortion of the imaging devices 12a, 12b, ..., 12n has been corrected. The points 40 are feature points on the road surface on which the mobile entity 100 is in travel. For simplicity, the imaging devices 12a, 12b, ..., 12n will be described with one imaging device 12 as a representative. The image 41a is a bird's-eye view image captured by the imaging device 12, and the coordinates are (u', v'). To simplify the description of the principle, the image 41a is a bird's-eye view image, but any image may be used as long as the relationship between a pixel and meters is known. In step S22, each point 40 is extracted on the image 41a as a moving point 42a. After the mobile entity 100 has traveled the movement amount $D_N$ 43, when each extracted moving point 42a is tracked in step S23 and the movement amount is calculated in step S24, all of each movement amount 44a on the bird's-eye view image 41a are constant. In addition, when each movement amount 44a on the bird's-eye view image 41a is transformed from a pixel into meters, each movement amount becomes a movement amount the same as the movement amount $D_N$ 43 of the mobile entity 100.

On the other hand, FIG. 8 shows a state in which the mobile entity 100 is in travel at an installation angle $α'_N$ 30b and a height $H'_N$ 31b different from those at the time of calibration. It is assumed that the distortion of the imaging device 12 has been corrected. After the mobile entity 100 has traveled the movement amount $D_N$ 43, when each extracted moving point 42b is tracked in step S23 and the movement amount is calculated in step S24, the movement amount 44b of each moving point 42b on the bird's-eye view image 41b differs depending on the position of the image, and the movement amount of a point close to the imaging device appears to be larger than the movement amount of a point far from the imaging device. When the moving point 40 is photographed at the installation angle $α'_N$ 30b and the height $H'_N$ 31b in this state, since the movement amount 44b on the image 41b is calculated to be mistaken for the plane 45, the movement amount of the moving point 42b close to the mobile entity 100 appears to be large, and the movement amount 44b of the moving point 42b far from the mobile entity 100 appears to be small. Therefore, when each movement amount 44b on the bird's-eye view image 41b is transformed from a pixel into meters, each movement amount 44b becomes a movement amount different from the movement amount $D_N$ 43 of the mobile entity 100. Therefore, when the movement amount of the moving point extracted in step S21 and step S22 is not constant, calibration is not performed, and when the distance to a point on the road surface is calculated in this state, the distance error is large.

FIG. 9 represents the installation angle $α_N$ 30a, height $H_N$ 31a, point 40, moving point 42a, and movement amount $D_N$ 43 of the mobile entity 100 the same as those in FIG. 7. It is assumed that the distortion of the bird's-eye view image 41c has not been corrected. When the mobile entity 100 travels the movement amount $D_N$ 43 in this state, the movement amount of each moving point 42a on the bird's- eye view image 41c is the movement amount 44c. Due to the distortion, the movement amount 44c differs depending on the area of the bird's-eye view image 41c of the moving point 42a, and when the distance to the moving point in that area is calculated, the distance error is large.

Figure 10:
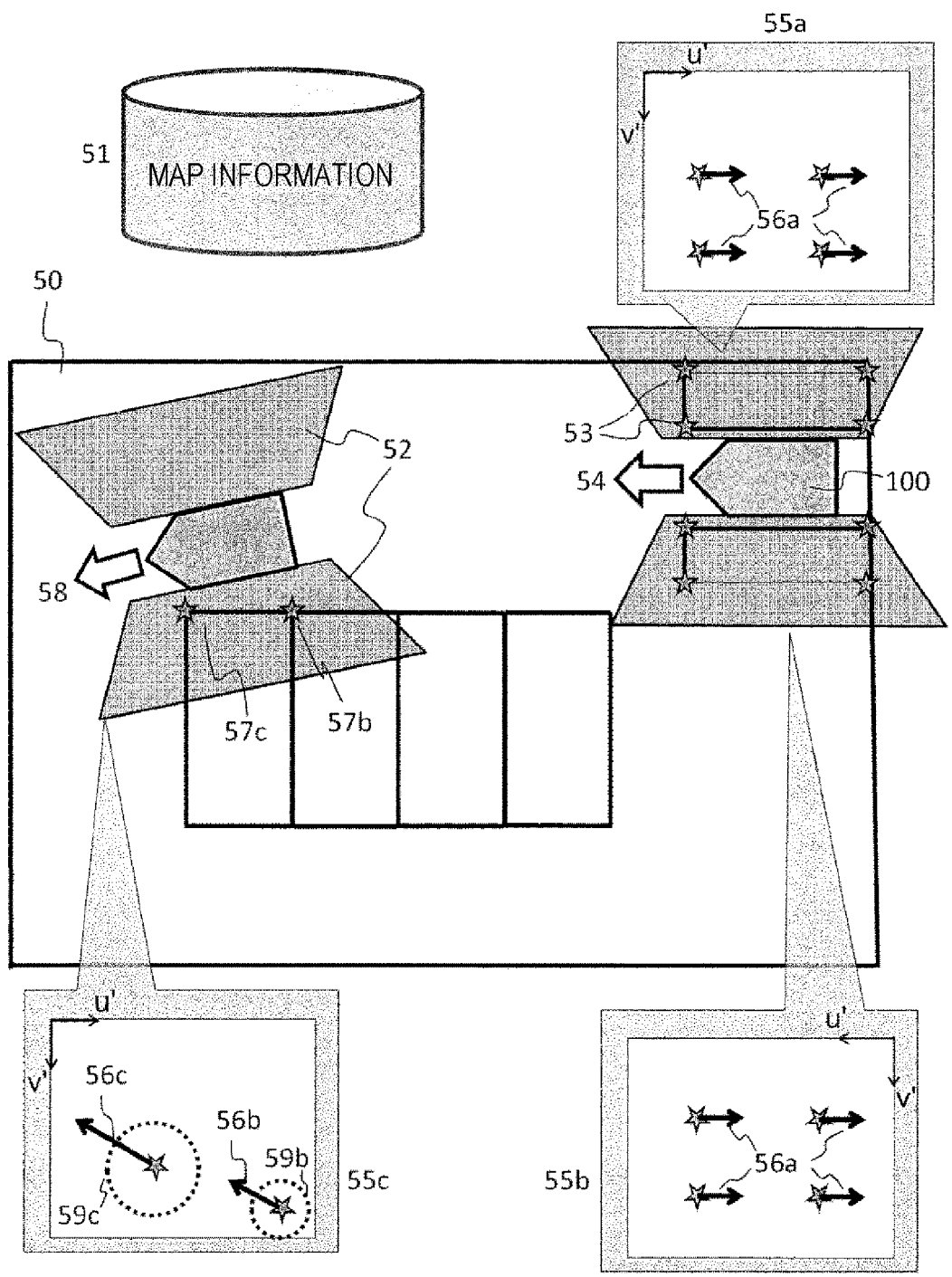
FIG. 10 is a diagram illustrating an application example.

An application example in the present embodiment will be described with reference to FIG. 10. FIG. 10 is a diagram illustrating an application example. The traveling environment 50 is an environment in which the mobile entity 100 travels. For simplicity, it is assumed that the traveling environment 50 is a parking lot. The map information 51 is a map of the traveling environment 50. The traveling environment 50 includes stationary landmarks such as lanes, parking frames, and signs of the traveling environment, and has accurate position information on each. The coordinate system of the map information 51 may represent the absolute position of the world or the relative position of a certain area. In the end, any coordinates may be used as long as the current position of the mobile entity 100 can be accurately displayed.

The imaging range 52 is an imaging range of the imaging devices 12a, 12b, . . . , 12n. For simplicity, it is assumed that there are two imaging devices 12a, 12b, . . . , 12n, which are installed on the right and left sides of the mobile entity 100 and face the right and left sides of the mobile entity 100. In this application example, the self position estimation of the mobile entity 100 is performed using the above-described accuracy estimation while the position of the landmark recognized by the two imaging devices is compared with the map information 51.

The moving point 53 is a point when the mobile entity 100 enters the traveling environment 50. For simplicity, it is assumed that the moving points in this application example are all corners of the parking frame. It is assumed that images acquired by the imaging devices after the mobile entity 100 has traveled the movement amount 54 are a bird's-eye view image 55a and a bird's-eye view image 55b. It is assumed that the movement amount of the moving point 53 on the images 55a and 55b after the mobile entity 100 has traveled the movement amount 54 is a movement amount 56a. Here, the movement amount 56a is a movement amount of the moving point extracted in step S22 using the imaging devices and the moving point when the extracted moving point is tracked in step S23.

Since the movement amount 56a has become the same movement amount as the actual movement amount 54 of the mobile entity 100 obtained in step S25, it is determined that the area around the movement amount 56a on the image is highly accurate (there is little recognition error). Therefore, when the self position of the mobile entity 100 is estimated from the map information 51 based on the calculated position of the moving point 53, the estimation can be performed with high accuracy.

The moving points 57b and 57c are moving points after the mobile entity 100 has left the start position. It is assumed that the image acquired by the imaging device after the mobile entity 100 has traveled the movement amount $d_N$ 58 is a bird's-eye view image 55c. It is assumed that the movement amount of the moving point 57b on the image 55c after the mobile entity 100 has traveled the moving amount $d_N$ 58 is a moving amount 56b and the movement amount of the moving point 57c is a movement amount 56c. Here, the movement amounts 56b and 56c are movement amounts of the moving points when the moving points are extracted from the moving points 57b and 57c in step S22 using the imaging device, and the extracted moving points are tracked in step S23. It is assumed that when the movement amount 56b is transformed into meters based on the installation height and angle of the imaging device, the movement amount has become a movement amount the same as the movement amount $d_N$ 58 of the mobile entity 100. Therefore, when the mobile entity 100 travels the movement amount $d_N$ 58, since the area around the movement amount 56b on the image 55c is highly accurate, it is determined that the accuracy of the detected moving point 57b is high, the position of the detected moving point 57b is matched with the map information 51, and position estimation is performed. On the other hand, since the movement amount 56c is different from the movement amount $d_N$ 58, it is determined that the accuracy of the area on the image around the movement amount 56c is low, therefore, matching is not performed with the map information 51, and tracking is performed in step S23 over several frames of the imaging device until accuracy is improved. As a method for increasing the accuracy of the low accuracy area, a time series filter such as a Kalman Filter is applied, for example. Details will be described below.

Therefore, the self position of the mobile entity 100 can be estimated with high accuracy from the map information 51 based on the accuracy determined as the calculated positions of the moving points 57b and 57c.

The accuracy determined as described above is used for position estimation as a weight $w_{N, p}$, for example. As shown in Formula (1), the difference between the actual movement amount $d_N$ 58 of the mobile entity 100 and the movement amount $I_{N, p}$ (p=1, 2, . . . , and the number of moving points) of the moving point is assumed to be $\text{error}_{N, p}$.

$$1/w_{N,p} = \text{error}_{N,p} = |d_N - I_{N,p}| \quad \text{Formula (1)}$$

In addition, the error in Formula (1) may be calculated not by using the meters but by using the ratio of the movement amount $d_N$ 58 of the mobile entity 100 as shown in Formula (2).

$$1/w_{N,p} = \text{error}_{N,p} = |d_N - I_{N,p}|/d_N \times 100 \quad \text{Formula (2)}$$

The weights in Formulae (1) and (2) may be substituted into parameters of a time-series filter such as a Kalman Filter, for example. When the Kalman Filter is used, it is necessary to set the error of the sensor or the system as the deviation ON, and the above-described error $\text{error}_{N, p}$ is substituted into the deviation $\sigma_N$ as shown in Formula (3).

In the case of FIG. 10, the above-described deviation $\sigma_N$ is indicated by deviation 59b and deviation 59c. Since the weight of the movement amount 56b is high, the deviation 59b is small, and since the weight of the movement amount 56c is low, the deviation 59c is large.

$$\sigma_N = \text{error}_{N,p} \quad \text{Formula (3)}$$

In addition, since pixels are geometrically transformed into meters based on the installation height and angle of the imaging device, if the landmark is far from the imaging device, the landmark is likely to be affected by the vibration of the mobile entity 100 and the like, so that the error is likely to increase. Therefore, the deviation $\sigma_N$ with respect to the distance/pixel position may be set without calculating the above-described error $\text{error}_{N, p}$. For example, assuming that the width (u' direction) of the bird's-eye view images 55a and 55b captured by the imaging device is denoted by W, and the height (v' direction) is denoted by V, since (u', v')=(W/2, V) is the pixel position closest to the mobile entity 100, the area has the smallest error. On the other hand, since (u', v')=(0, 0) or (u', v')=(W, 0) is the pixel position farthest from the mobile entity 100, the area has the largest error. Therefore, assuming that the maximum deviation in the u' direction is $\sigma_{u,\,max}$, the deviation $\sigma$ with respect to the pixel u can be obtained from Formula (4).

$$\sigma_u = \sigma_{u,max} |W/2 - u'|/(W/2) \quad \text{Formula (4)}$$

Assuming that the maximum deviation in the v' direction is $\sigma_{v,\,max}$ in the same manner as in the u direction, the deviation $\sigma_v$ with respect to the pixel v' can be obtained from Formula (5).

$$\sigma_v = \sigma_{v,max} |V - v'|/(V) \quad \text{Formula (5)}$$

By combining $\sigma_u$ and $\sigma_v$, the deviation $\sigma_N$ can be obtained, for example, from Formula (6).

$$\sigma_N = \sigma_u + \sigma_v \quad \text{Formula (6)}$$

In addition, the deviation $\sigma_N$ may be calculated from Formula (7) by combining $\sigma_u$ and $\sigma_v$.

$$\sigma_N = \sigma_u \sigma_v \quad \text{Formula (7)}$$

In addition, weights m (1, 2, ..., m) may be assigned to $\sigma_u$ and $\sigma_v$, and deviation $\sigma_N$ may be calculated from Formula (8).

$$\sigma_N = (\sigma_u^m + \sigma_v^m)^{1/m} \quad \text{Formula (8)}$$

In addition, when the above-described $\text{error}_{N,\,p}$ is calculated, the deviation $\sigma_N$ may be calculated as shown in Formula (9) by combining $\text{error}_{N,\,p}$ with $\sigma_u$ and $\sigma_v$.

$$\sigma_N = \text{error}_{N,p}(\sigma_u^m + \sigma_v^m)^{1/m} \quad \text{Formula (9)}$$

The calculation of the deviation $\sigma_N$ may be any of the Formulae (1) to (9) as long as the combination includes $d_N$, $I_{N,\,p}$, $\text{error}_{N,\,p}$, $\sigma_u$, $\sigma_v$, u, and v. In addition, the above-described setting of $\sigma_{u,\,max}$ and $\sigma_{v,\,max}$ may be set to fixed values or set empirically. In addition, since $\sigma_{u,\,max}$ and $\sigma_{v,\,max}$ are not necessarily $\sigma_{u,\,max} = \sigma_{v,\,max}$, different parameters may be set.

When only one moving point is present in the imaging device (p=1), the self position $(X, Y)_N$ and the azimuth $(\theta)_N$ of the mobile entity 100 are calculated based on the position $(X, Y, \theta)_{p=1}$ of the moving point as expressed by Formula (10).

$$(X, Y, \theta)_N = w_{N,p=1}(X, Y, \theta)_{p=1} \quad \text{Formula (10)}$$

In addition, when there are a plurality of moving points in the imaging device, the self position $(X, Y, \theta)_N$ of the mobile entity 100 can be obtained from Formula (11).

$$(X, Y, \theta)_N = [W_{N,1}(X,\theta)_1 + \ldots + w_{N,p}(X,Y,\theta)_p] / (w_{N,1} + \ldots + w_{N,p}) \quad \text{Formula (11)}$$

When the self position of the mobile entity 100 is estimated, any combination of the calculated positions (X, Y, $\theta$)1, ..., (X, Y, $\theta$)p and weights $w_{N,\,1}$, ..., $w_{N,p}$ may be used other than the above Formulae (10) and (11).

In addition, in the present embodiment, it is assumed that the moving point is defined as the corner of the parking frame, and the moving point can be recognized by the imaging device 12 using the image processing technique without any problem. On the other hand, in actual parking lots and roads, there are moving objects such as pedestrians and other vehicles, as a result, it may be difficult to recognize the corners of the parking frame. However, since such an obstacle is higher than the road surface, even if the movement amount of the moving point is calculated in steps S21 to S24, the movement amount $I_{N,p}$ increases, and the error $\text{error}_{N,\,p}$ also increases. Therefore, even if an obstacle is erroneously recognized as a moving point, since the weight $w_{N,\,p}$ becomes low, the result does not affect the position estimation result.

Figure 11:
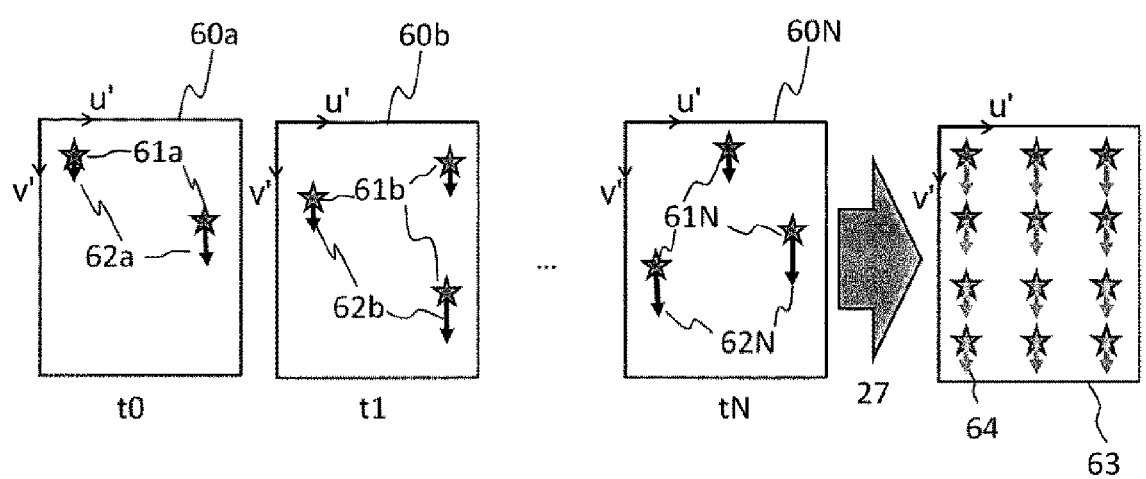
FIG. 11 is an explanatory diagram of calibration in an embodiment.

The calibration according to the present embodiment will be described with reference to FIGS. 11 and 12. FIG. 11 is an explanatory diagram of the calibration in the present embodiment, and FIG. 12 is a flowchart of the calibration.

Images 60a, 60b, ..., 60N in FIG. 11 are images captured in step S21 in time series at time t0, t1, ..., tN by the imaging devices 12a, 12b, ..., 12n. The moving points 61a, 61b, ..., 61N are moving points extracted from the images 60a, 60b, ..., 60N in step S22. The movement amounts 62a, 62b, ..., 62N are the calculated movement amounts of the moving points 61a, 61b, ..., 61N in step S23 and step S24. Here, it is assumed that calibration has not been performed, and the movement amounts 62a, 62b, ..., 62N are not always constant.

The image 63 is an image after the calibration S27 is performed. The movement amount 64 is a movement amount of the moving point on the image 63 calculated in steps S21 to S24 after the calibration step S27 is performed. Since the image 63 is an image after the calibration has been performed, the movement amount 64 of the moving point calculated in steps S21 to S24 is constant.

Figure 12:
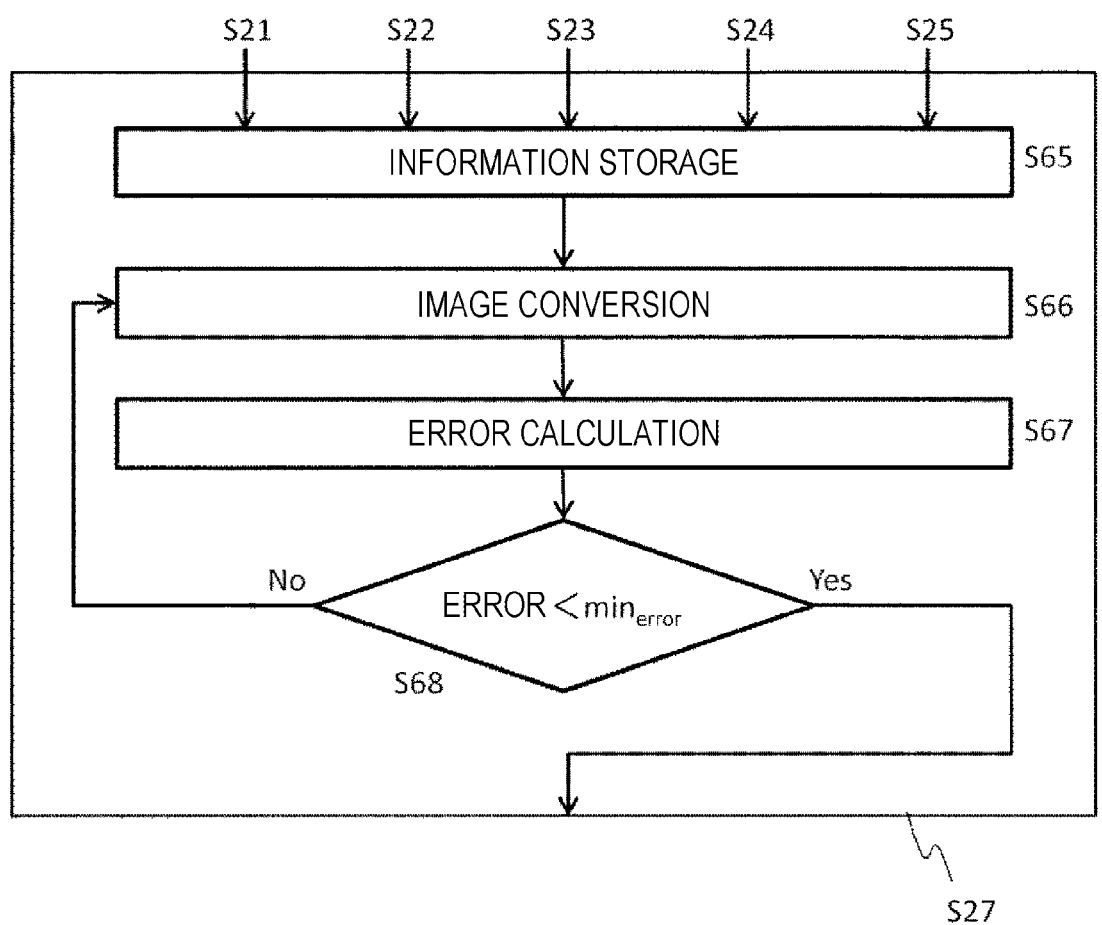
FIG. 12 is a flowchart of calibration.

Steps S65 to S68 in FIG. 12 are processing in the calibration S27. Step S65 is a step of storing the information calculated in steps S21 to S25. Images 60a, 60b, ..., 60N, moving points 61a, 61b, ..., 61N, movement amounts 62a, 62b, ..., 62N, the movement amount of the mobile entity 100, and the like are stored in the memory 16.

Step S66 is a step of performing image transformation on the images 60a, 60b, ..., 60N and the moving points 61a, 61b, ..., 61N tracked in step S23. The image transformation of S66 is, for example, an affine transformation or a perspective transformation, and rotation and translation of the images 60a, 60b, ..., 60N and the moving points 61a, 61b, ..., 61N tracked in step S23 are transformed. Details of step S66 will be described below.

In step S67, from the images 60a, 60b, ..., 60N and the moving points 61a, 61b, ..., 61N tracked in step S23 transformed in step S66, the respective new moving amounts $I_{N,\,p,i}$ (i=1, ..., the number of calibration) of the moving points 61a, 61b, ..., 61N are calculated. As shown in the Formula (12), the errors $E_{N,\,p,\,i}$ between the newly calculated $I_{N,\,p,\,i}$ and the movement amounts $d_0$, ..., $d_N$ of the mobile entity 100 stored in time series in step S65 are calculated.

$$E_{N,p,i} = |d_N - I_{N,p,i}| \quad \text{Formula (12)}$$

Step S68 is a step of comparing the errors $E_{N,\,p,\,i}$ calculated in step S67 with a preset threshold value $\min_{error}$. If the error $E_{N,\,p,\,i}$ calculated in step S67 is smaller than $\min_{error}$, step S27 ends, and if the error $E_{N,\,p,\,i}$ calculated in step S67 are larger than $\min_{error}$, the process returns to step S66.

At least two frames are essential for the number of frames N, and the maximum value of N may be set based on the number of moving points obtained in time series in steps S21 to S24, for example. Basically, if the number of moving points is large, the calibration error is small, but the processing load is large. Therefore, for example, if the number of moving points obtained in time series in steps S21 to S24 is larger than a preset threshold value, calibration is performed using all the number of frames and moving points obtained in time series in steps S21 to S24 up to that time. In addition, since there is a high possibility that the parameter becomes different from the calibration parameter performed last time depending on the traveling speed of the mobile entity 100, N may be set according to the speed of the mobile entity 100. For example, if the speed of the mobile entity 100 is low, since the calibration parameter does not change significantly, N is set high, and if the speed of the mobile entity 100 is high, since the calibration parameter changes significantly, N is set low, calibration is performed at high frequency. In addition, N may be set based on the traveling time. For example, if the processing load has a margin, the calibration is performed every several ms or tens of ms, and if the processing load does not have a margin, the calibration is performed every several hundred ms or several seconds.

Figure 13:
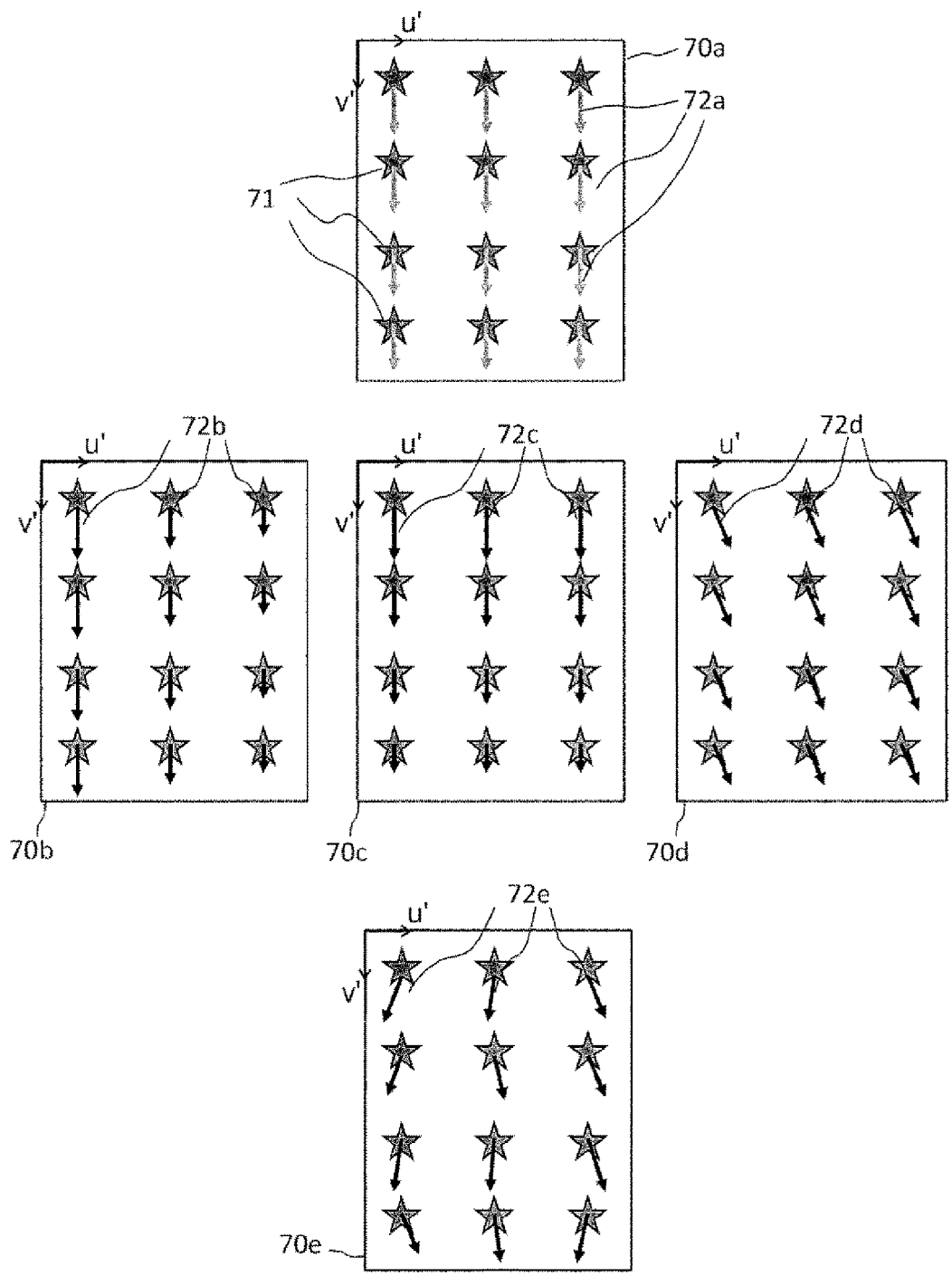
FIG. 13 is a diagram illustrating details of an image transformation step.

Details of step S66 will be described with reference to FIG. 13. FIG. 13 is a diagram illustrating details of the image transformation step.

The bird's-eye view image 70a is an image captured by the imaging device and transformed into a bird's-eye view image. It is assumed that the moving point extracted in step S22 is a moving point 71 and the movement amount of each of the moving points 71 obtained in steps S21 to S24 is a movement amount 72a. When the movement amount 72a of the moving point 71 is obtained in steps S21 to S24, it is assumed that the calibration of the imaging device has been performed, and the movement amount 72a of each of the moving points 71 obtained in steps S21 to S24 is constant. Since the movement amounts 72a of the moving points 71 calculated in steps S21 to S24 are all constant, the roll, pitch, and yaw of the imaging device are the same as when the calibration is performed. On the other hand, even if the movement amounts 72a of the moving points 71 calculated in steps S21 to S24 are all constant, the height of the imaging device may be different from that when the calibration is performed. Here, when the height of the imaging device changes, since all the movement amounts 72a of the image 70a change, the height of the imaging device is calibrated by comparing with the actual movement amount of the mobile entity 100. When the height of the imaging device has been calibrated, all the movement amounts 72a are the same as the actual movement amount of the mobile entity 100, and therefore the height of the imaging device is corrected until $error_{N,p}$ in Formula (1) approaches 0. In the correction, for example, a new height is set by trial and error, $error_{N,p}$ is calculated again, and the correction is repeated until $error_{N,p}$ approaches 0. In addition, when the movement amount 72a becomes larger than the actual movement amount $d_N$ of the mobile entity 100, it has a meaning that the actual height of the imaging device is lower than that at the time of calibration, so that the height parameter of the imaging device is set low until $error_{N,p}$ approaches 0.

Since the movement amount of the mobile entity estimated in step S25 is not always accurate, and there is an error in tracking the moving point in step S23, if $error_{N,p}$ does not become 0, but approaches 0, calibration of the whole area of the image has been completed.

On the other hand, the bird's-eye view image 70b shows a case where the roll angle of the imaging device is different from that at the time of performing the calibration. In this case, the movement amount 72b of the moving point 71 obtained in steps S21 to S24 differs depending on the area of the bird's-eye view image 70b. For example, the movement amount 72b of the moving point 71 on the left side of the bird's-eye view image 70b is larger than the movement amount 72b on the right side of the bird's-eye view image 70b. In addition, the movement amount 72b of the moving point 71 at the center of the bird's-eye view image 70b is not different from the movement amount 72a of the bird's-eye view image 70a. Therefore, when there is a pattern of the movement amount 72b, the roll angle is corrected until $error_{N,p}$ of the movement amount 72b of the moving point 71 of the bird's-eye view image 70b becomes 0 because of an error in the roll angle.

The bird's-eye view image 70c shows a case where the pitch angle of the imaging device is different from that at the time of performing the calibration. In this case, the movement amount 72c of the moving point 71 obtained in steps S21 to S24 differs depending on the area of the bird's-eye view image 70c. For example, the movement amount 72c of the moving point 71 on the bird's-eye view image 70c is larger than the movement amount 72c below the bird's-eye view image 70c. The closer to v=0, the larger the movement amount 72c, and the farther from v=0, the smaller the movement amount 72c. Therefore, when there is a pattern of the movement amount 72c, the pitch angle is corrected until $error_{N,p}$ of the movement amount 72c of the moving point 71 of the bird's-eye view image 70c becomes zero because of an error in the pitch angle.

The bird's-eye view image 70d shows a case where the yaw angle of the imaging device 12 is different from that at the time of performing the calibration. In this case, the movement amount 72d of the moving point 71 obtained in steps S21 to S24 is constant, but moves in a direction different from the v' direction. Therefore, when there is a pattern of this movement amount 72c, the yaw angle is corrected until the movement amount 72d of the moving point 71 of the bird's-eye view image 70d moves in the same direction as the v' direction due to an error in the yaw angle.

The bird's-eye view image 70e shows a case where the distortion of the imaging devices 12a, 12b, ..., 12n has not been corrected. In this case, the direction of the movement amount 72e of the moving point 71 obtained in steps S21 to S24 is not constant. Therefore, the distortion is corrected until the direction of the movement amount 72e of the moving point 71 of the bird's-eye view image 70e becomes constant.

As described above, according to the present invention, the accuracy of estimating the position of a mobile entity can be improved even when travel is in progress or there is an error in the calibration performed.

It should be noted that the present invention is not limited to the embodiments described above, and includes various modifications. For example, the above-described embodiments are described in detail for easy understanding of the present invention, and are not necessarily limited to those including all the configurations described. In addition, a part of the configuration of one embodiment can be replaced with the configuration of another embodiment, and the configuration of another embodiment can be added to the configuration of one embodiment. In addition, it is possible to add, delete, and replace another configuration with respect to a part of the configuration of each of the embodiments. In addition, each of the above-described configurations, functions, processing units, processing means, and the like may be partially or entirely achieved by hardware by, for example, designing with integrated circuits. In addition, each of the above-described configurations, functions, and the like may be achieved by software by interpreting and executing a program that achieves each function by the processor. Information such as a program, a table, and a file for achieving each function can be stored in a memory, a hard disk, a recording device such as an Solid State Drive (SSD), or a recording medium such as an IC card, an SD card, or a DVD.

REFERENCE SIGNS LIST 1 position estimation device
12 imaging device 13 information processing device
14 image processing unit
15 control unit
16 memory
17 display unit
18 bus
51 map information
100 mobile entity
212 road
213 landmark

The invention claimed is:

1. A mobile entity position estimation device comprising:
a mobile entity;
an imaging device provided in the mobile entity; and
an information processing device configured to
determine a first movement amount by which a detection point being a same object has moved on based on a first image and a second image acquired by the imaging device and a second movement amount by which the mobile entity has moved during the acquisition of the first image and the second image,
determine accuracy of recognizing a detection point acquired by the imaging device based on the first movement amount and the second movement amount, and
estimate a position of the mobile entity based on the accuracy of recognition and position information that pertains to the detection point,
wherein the first movement amount is a movement amount obtained by transforming a movement amount on a first image and a second image being obtained into spatial coordinates of the mobile entity,
wherein the recognition accuracy is a difference between the first movement amount and the second movement amount,
wherein a weight of a detection point is determined from the difference, and
wherein a position of the mobile entity is estimated from the weight and position information on the detection point.

2. The mobile entity position estimation device according to claim 1, wherein position information of the detection point is position information of the detection point on map information.

3. The mobile entity position estimation device according to claim 2, wherein calibration of an imaging device is performed based on the difference.

4. The mobile entity position estimation device according to claim 3, wherein the imaging device includes a plurality of imaging devices having different imaging directions.

5. A mobile entity position estimation method comprising:
determining a first movement amount by which a detection point being a same object extracted from each of captured images of two or more frames acquired by an imaging device provided in a mobile entity has moved;
determining a second movement amount by which the mobile entity has moved during the acquisition of the captured images of two or more frames are acquired;
determining accuracy of a detection point acquired by the imaging device based on the first movement amount and the second movement amount;
estimating a position of a mobile entity based on the accuracy and position information on the detection point;
determining a weight of the detection point based on the accuracy; and
estimating a position of a mobile entity from the weight and position information on the detection point.

6. The mobile entity position estimation method according to claim 5, further comprising:
calibrating an imaging device based on the accuracy, and estimating a position of a mobile entity.

* * * * *